United States Patent
Tay et al.

(10) Patent No.: US 7,284,432 B2
(45) Date of Patent: Oct. 23, 2007

(54) ACCELERATION SENSITIVE SWITCH

(75) Inventors: Francis Eng Hock Tay, Singapore (SG); Ki Bang Lee, Singapore (SG)

(73) Assignee: Agency for Science, Technology & Research, Singapore (SG)

( * ) Notice: Subject to any disclaimer, the term of this patent is extended or adjusted under 35 U.S.C. 154(b) by 0 days.

(21) Appl. No.: 11/155,380

(22) Filed: Jun. 17, 2005

(65) Prior Publication Data

US 2006/0219536 A1 Oct. 5, 2006

Related U.S. Application Data

(60) Provisional application No. 60/666,411, filed on Mar. 29, 2005.

(51) Int. Cl.
*G01P 15/125* (2006.01)

(52) U.S. Cl. ............................. 73/514.32; 200/61.45 R

(58) Field of Classification Search ............. 73/514.32; 200/61.45 R
See application file for complete search history.

(56) References Cited

U.S. PATENT DOCUMENTS

| | | | |
|---|---|---|---|
| 5,353,641 A * | 10/1994 | Tang | 73/514.18 |
| 5,447,068 A * | 9/1995 | Tang | 73/514.32 |
| 5,885,468 A * | 3/1999 | Kozlowski | 216/2 |
| 5,905,241 A | 5/1999 | Park et al. | |
| 5,939,171 A * | 8/1999 | Biebl | 428/141 |
| 6,192,757 B1 * | 2/2001 | Tsang et al. | 73/514.32 |
| 6,236,005 B1 | 5/2001 | Kvisteroey et al. | |
| 6,336,658 B1 | 1/2002 | Itoigawa et al. | |
| 6,388,299 B1 * | 5/2002 | Kang et al. | 257/415 |
| 2002/0113281 A1 * | 8/2002 | Cunningham et al. | 257/415 |
| 2004/0161869 A1 | 8/2004 | Kang | |

FOREIGN PATENT DOCUMENTS

EP 0924730 6/1999

\* cited by examiner

*Primary Examiner*—Hezron Williams
*Assistant Examiner*—Samir M. Shah
(74) *Attorney, Agent, or Firm*—Buchanan Ingersoll & Rooney, LLP

(57) ABSTRACT

An acceleration sensitive switch arrangement (208) includes an acceleration sensitive variable capacitor (200), a detection circuit (202) for detecting a capacitance value of the variable capacitor (200), and a switching circuit (204) responsive to a comparison between the detected capacitance and a threshold value.

9 Claims, 4 Drawing Sheets

ACCELERATION SENSITIVE SWITCH

CROSS-REFERENCE TO RELATED APPLICATIONS

This application claims priority under 35 U.S.C. §119 to U.S. Provisional Application No. 60/666,411, filed Mar. 29, 2005, which is incorporated herein by reference in its entirety.

FIELD OF THE INVENTION

The invention relates to an acceleration sensitive switch, more particularly, to a switching arrangement with a variable capacitor that is sensitive to acceleration.

BACKGROUND

Acceleration switches are designed to issue a signal when a threshold acceleration value is detected. Acceleration switches are widely used in air bag systems to detect the sudden deceleration of a vehicle during crash. Acceleration switches are usually mechanical switches having a spring-loaded mass that makes contact with an electrode, thus acting as a switch, when subjected to acceleration greater than a predetermined threshold value of acceleration. Today, acceleration switches are commonly manufactured using micromachining.

U.S. Pat. No. 6,336,658B1 discloses an acceleration switch having a first and second inertia mass where the second inertia mass is lighter than the first inertia mass. A pair of torsion bars connect to the first inertia mass and act as a turning shaft for the first inertia mass. The acceleration switch also has a pair of electrodes formed on a substrate facing the second inertia mass. When acceleration of a predetermined value or greater is applied to the acceleration switch, the second inertia mass moves into contact with the pair of electrodes to act as a switch.

U.S. Pat. No. 6,236,005B1 discloses an acceleration switch having an inertia mass and an electrode element that are pivoted about an axis of a spring element that connects the inertia mass and the electrode element to a housing. When the switch is subject to acceleration greater than a predetermined value, an electrical contact point on the electrode element touches a corresponding contact area in the housing, so that an electrical signal is provided to indicate that the predetermined value of acceleration is exceeded.

The threshold value of acceleration will depend on the physical parameters of the switches such as the stiffness of the torsion bar or the spring element, the inertia mass, and the distance between the contacting electrodes. The threshold value of the switches described in these publications is generally difficult to adjust once the switches are made.

To overcome the limitation in adjusting the threshold value, various configurations of acceleration switch are proposed where the threshold value is adjustable by changing electrode voltage. U.S. Pat. No. 5,905,241 discloses an acceleration switch that uses snap-through buckling phenomenon of a bimorph beam to displace a movable electrode into contact with another electrode at a fixed distance when a threshold acceleration force is experienced. EP Patent Application 0924730A1 discloses an acceleration switch equipped with an inertial mass that is deflectable from a holding position to an actuated position in response to a predetermined acceleration force. A voltage controlled hold plate generates an electrostatic force that opposes the acceleration forces and holds the inertial mass in the holding position until overcome by the predetermined acceleration force. In both cases, the predetermined acceleration force necessary to trigger the switch can be adjusted by adjusting the electrode voltage or the voltage applied to the hold plate.

However, the above switches involve at least one electrical contact that is formed with metal and may be subjected to problems such as micro-welding, arcing, and oxidation, which may cause failure of the switches.

US patent application Ser. No. 2004/0161869A1 discloses a contactless acceleration switch without metal contacts as shown in FIG. 1. The acceleration switch 100 comprises a mass 112 attached to a spring 114, a substrate layer 102 with a threshold adjustment channel 108 located between a source 104 and a drain 106 thereon, and a gate insulating layer 120 located above the substrate layer 102,. The threshold adjustment channel 108, the source 104, and the drain 106 are implanted in the substrate layer 102 positioned at a predetermined distance from the mass 112. The mass 112 operates as a moveable gate in combination with the source 104 and the drain 106 to form a field effect transistor (FET). When acceleration level exceeds a threshold acceleration value, an electric field may form between the mass 112 and the substrate layer 102, creating an electrostatic force that attract the mass 112 to the substrate layer 102. The mass 112 moves towards the substrate layer 102 to a position of critical distance at which point the electrostatic force exceeds a spring force created by the spring 114. The mass 112 may suddenly contact the gate insulating layer 120 and the strength of the electric field reaches a maximum level, thus inverting the threshold adjustment channel 108 and allowing current to flow between the source 104 and the drain 106, which turn on the FET. One problem with the switch 100 is that a substantially constant voltage in the range from less than five volts for low acceleration, to hundreds of volts for large acceleration range devices, has to be applied between the mass 112 and the substrate layer 102.

It is an object of the invention to provide an acceleration-sensitive switch that overcomes or ameliorates one or more of the disadvantages of the prior art or which at least provides a useful alternative.

SUMMARY OF THE INVENTION

Accordingly, in a first aspect, the disclosure provides an acceleration sensitive switching arrangement comprising:
an acceleration sensitive variable capacitor;
a detection circuit for detecting a capacitance value of the variable capacitor; and
a switching circuit responsive to a comparison between the detected capacitance and a threshold value.

The variable capacitor preferably comprises a base with at least one first electrode thereon and a mass forming a second electrode resiliently suspended by at least one spring a first predetermined distance from the base. The spring applies a first force to the mass in a direction away from the base.

The first electrode is preferably adapted to provide an electrostatic attractive force to the mass, the attractive force being inversely proportional to the distance between the electrode and the mass.

The detection circuit preferably comprises a voltage supply and a resistive load. The voltage supply is preferably an alternating voltage supply.

The switching circuit preferably comprises a differential amplifier providing a first input voltage and a potentiometer providing a second input voltage to an electronic switch. The first input voltage corresponds to the detected capacitance and the second input voltage corresponds to the threshold value. The electronic switch is preferably triggered positive upon the second input voltage becomes larger than the first input voltage.

The threshold value is preferably variable by adjusting the potentiometer to change the second input voltage.

In a second aspect, the disclosure provides an acceleration sensitive variable capacitor comprising:

a base with at least one first electrode thereon;

a mass forming a second electrode resiliently suspended by at least one spring a first predetermined distance from the base, the spring applying a spring force to the mass in a direction away from the base; and the first electrode being adapted to provide an electrostatic attractive force to the mass, the attractive force being inversely proportional to the distance between the first electrode and the mass, wherein the attractive force overcomes the spring force and draws the mass towards the base upon the mass being moved, due to acceleration, to within a second predetermined distance from the base.

In a first aspect of the capacitor, the mass preferably includes at least one spacer formed on the surface facing the base. The spacer is preferably electrically insulated so as to prevent the mass to form electrical contact with the first electrode when the mass moved to the second predetermined distance.

In a second aspect of the capacitor, a layer of insulator is preferably formed on the first electrode separating the mass and the first electrode when the mass moved to the second predetermined distance.

In a third aspect of the capacitor, at least one third electrode is preferably formed on the base, adjacent to the first electrode, and having same electrically potential with the mass. The spacer preferably comes into contact with the third electrode when the mass moved to the second predetermined distance.

Preferably, the capacitance of the capacitor increases to a maximum upon the mass moved to the second predetermined distance, indicative of the capacitor undergoing a predetermined level of acceleration.

The maximum capacitance of the capacitor being variable, most preferably by changing voltage supplied to the first electrode and the mass, so as to vary the level of acceleration required to move the mass to the second predetermined distance.

The capacitance between the first electrode and the mass is preferably measured by a detection circuit comprising a voltage supply and a resistive load.

BRIEF DESCRIPTION OF THE DRAWINGS

At least one embodiment of the invention will now be described, by way of example only, with reference to the accompanying drawings in which.

DETAILED DESCRIPTION

Figure 1:
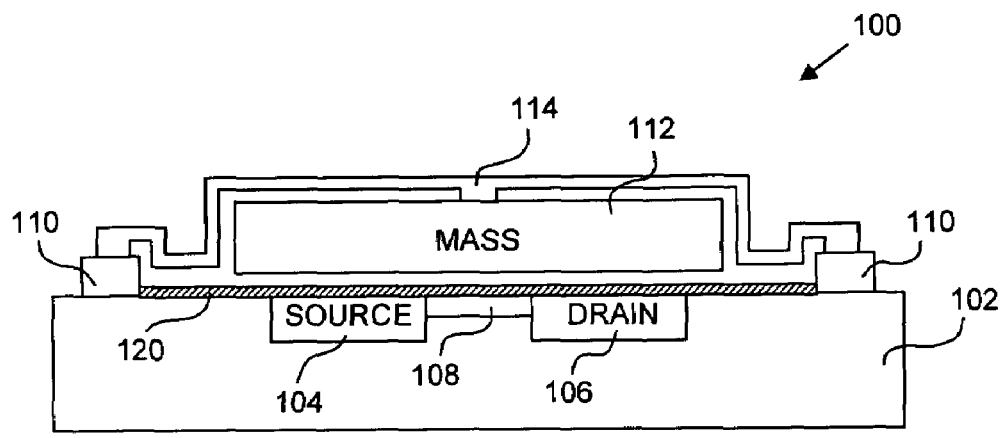
FIG. 1 is a schematic view of a prior art acceleration switch.
Figure 2:
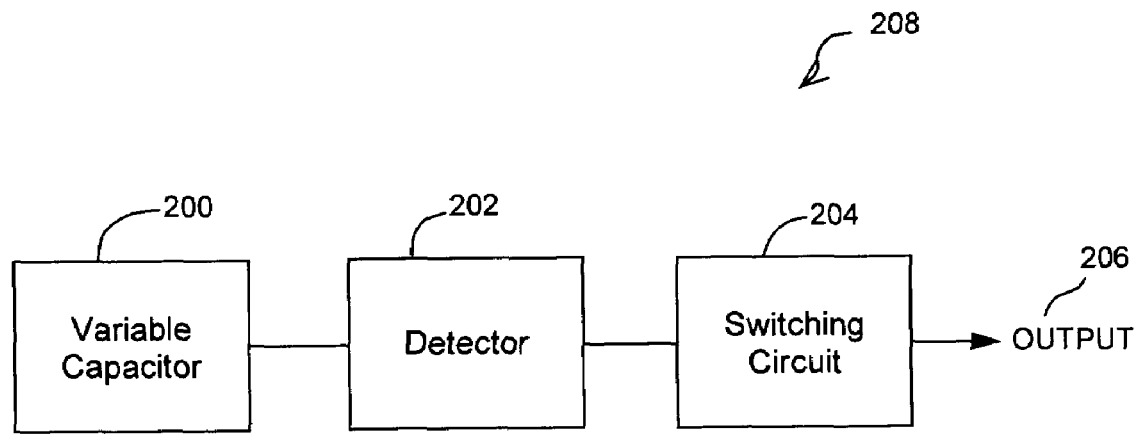
FIG. 2 is a schematic block diagram representation of a switching arrangement according to the disclosure.

FIG. 2 shows an acceleration sensitive switching arrangement 208. The switching arrangement 208 comprises an acceleration sensitive variable capacitor 200, a detector 202, and a switching circuit 204. The capacitance of the variable capacitor 200 is configured to change when the capacitor 200 is exposed to acceleration. The detector 202 includes a detecting circuit for detecting the capacitance of the capacitor 200 and outputting a corresponding electrical signal, such as voltage, to the switching circuit 204. The switching circuit 204 compares the electrical signal to a threshold value. As such, when a value of capacitance corresponding to a threshold value of acceleration is measured by the detector 200, the switching circuit 204 will be triggered to issue an output 206, which is an electrical signal. The electrical signal may be sent to a controller for further processing.

Figure 3:
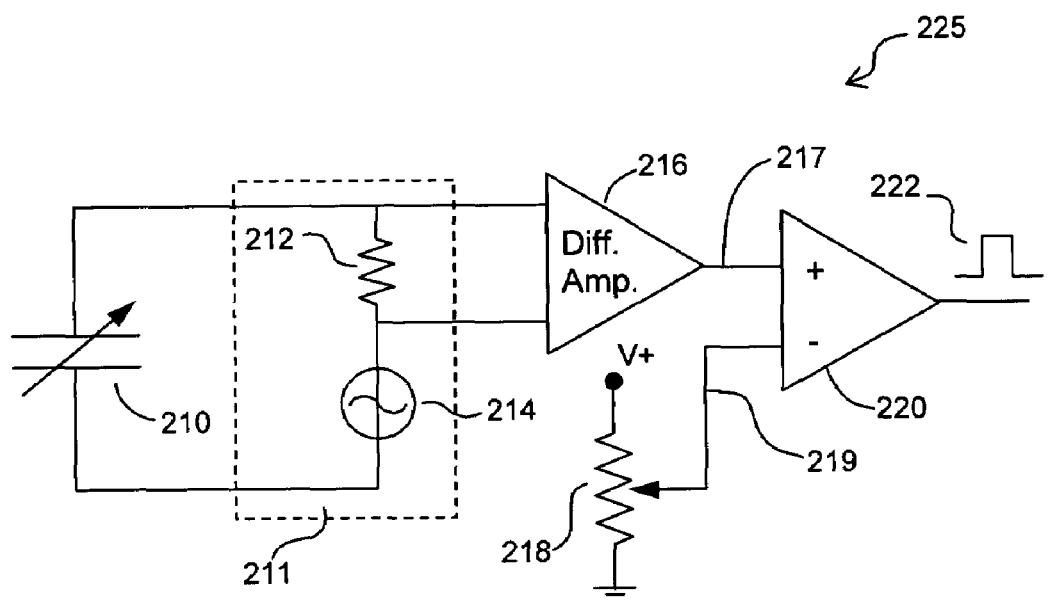
FIG. 3 is an electrical schematic diagram of the acceleration sensitive switching arrangement in accordance with a preferred implementation.

FIG. 3 shows an electrical circuit 225 in which a variable capacitor 210, which will be discussed in more detail later, is connected to a detector 211. The detector 211 includes an AC source 214 and a known load 212, which is typically resistive. The voltage across the load 212 is related, according to Ohm's law, to the capacitance of the capacitor 210. The voltage is input to a differential amplifier 216 to obtain a single output 217, which is subsequently provided to a first input of an electronic switch 220. The switch 220 also receives a second input signal, which is a predetermined threshold voltage 219 obtained from a potentiometer 218. The switch 220 compares the two input voltage values, 217 and 219, and will be triggered positive if the voltage 217 is larger than the threshold voltage 219 upon the second input. The threshold voltage 219 set by the potentiometer 218 can be adjusted so that the switch 220 will respond to a different value of maximum capacitance, which is associated to threshold value of acceleration experienced by the capacitor 210.

Figure 4:
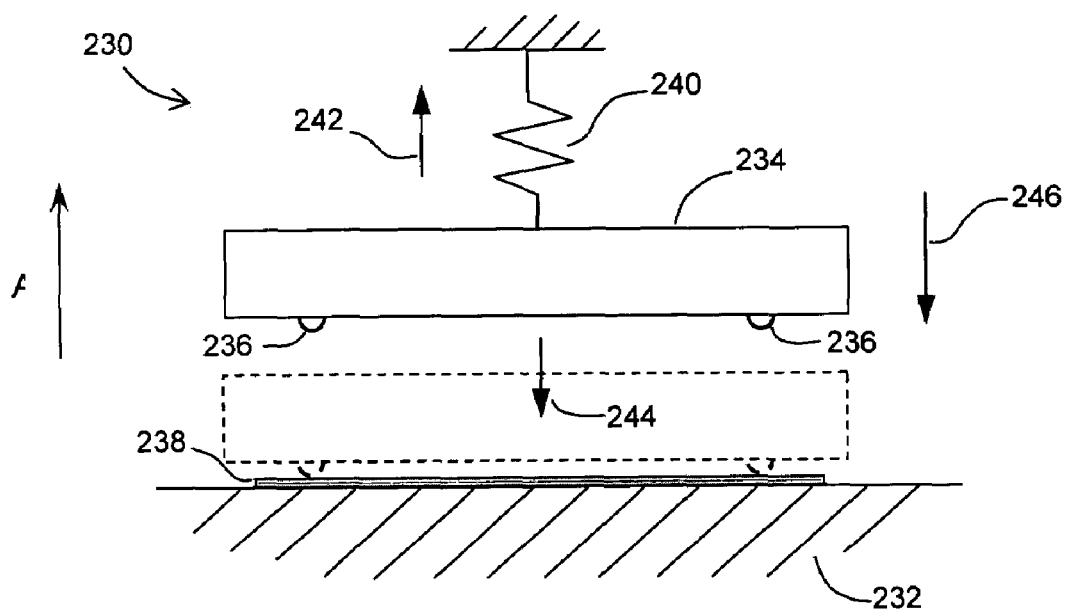
FIGS. 4-6 are each schematic views of variable capacitors useful in the arrangement of FIG. 3.

FIG. 4 shows a schematic view of a first configuration of an acceleration sensitive variable capacitor 230. The variable capacitor 230 comprises a base 232 with an electrode 238 thereon and a proof mass 234 forming a second electrode resiliently suspended by a spring 240. The spring 240 applies a spring force 242 to the mass 234 in a direction away from the base 232. The spring force 242 varies linearly relative to the extension of the spring 240. The AC source 214 in the detector 211 supplies an alternating voltage between the mass 234 and the electrode 238, thereby forming a capacitor. The electric field formed between the mass 234 and the electrode 238 will create an electrostatic attractive force 244 that draws the mass 234 towards the base 232. The electrostatic attractive force 244 increases exponentially as the space between the mass 234 and the electrode 238 reduces.

When the capacitor 230 is not in motion or there is no acceleration, the spring force 242 is larger than the electrostatic attractive force 244 and thus, the mass 234 is resiliently suspended at a stable position away from the base 232. If the capacitor 230 starts to move in a direction A, away from the plane of the base 232 towards the mass 234, the capacitor 230 will experience acceleration in the same direction. An acceleration force 246 associated with the acceleration will act upon the mass 234 and move the mass towards the base 232. When the mass 234 is moved by the acceleration force 246 a distance away from the stable position towards the base 232, the spring force 242 of the spring 240 increases linearly while the electrostatic attractive force 244 increases exponentially relative to the distance. There is a critical distance away from the stable position where the spring force 242 and the electrostatic attractive force 244 increase at a same rate. Below the critical distance, the electrostatic force 244 increases at a lower rate than the spring force 242, resulting a positive effective spring force. If the acceleration force 246 is less than the positive effective spring force, the mass 234 will be pulled back to the stable position by the positive effective spring force once the acceleration force 246 is removed. If the acceleration force 246 is large enough to move the mass 234 to the critical distance, the acceleration force 246 will continue to move the mass 234 further towards the base 232 into a position where the electrostatic attractive force 244 overcomes the spring force 234 and draws the mass 234 towards the electrode 238.

FIG. 4 also shows, arranged on the mass 234, at least one spacer 236 formed on the surface facing the base 232. The spacers 236 are electrically insulating and are configured to come into contact with the electrode 238 when the electrostatic attractive force 244 draws the mass 234 close to the electrode 238. The insulated spacers 236 prevent the mass 234 from touching the electrode 238 so that the capacitor formed thereby will not short-circuit and to avoid any attractive binding between the mass 234 and the electrode 238 that might otherwise occur. The capacitance between the mass 234 and the electrode 238 reaches a maximum when the spacers 236 are in contact with the electrode 238. A maximum voltage output from the differential amplifier 216 corresponding to the maximum capacitance will be detected as described earlier. As the maximum voltage is larger than the threshold voltage 219 obtained from the potentiometer 218, the electronic switch 220 will be triggered.

The mass 234 will stay at the position where the spacers 236 are in contact with the electrode 238, even if the acceleration force is removed, because the electrostatic attractive force 244 is larger than the spring force 242. The capacitance is always kept at a maximum and the electronic switch 220 is turned on continuously once the capacitor 230 has experienced acceleration larger than a threshold value, even if the acceleration only exceeded the threshold value for a short duration. To turn off or reset the switching arrangement 208, a zero voltage is applied to the capacitor 230 via the source 214, where the electrostatic attractive force 244 is removed. The spring force 242 will pull the mass 234 away from the base 232, releasing the contact between the spacers 236 and the electrode 238.

It is known that the electrostatic attractive force 244 is a function of the voltage applied to the capacitor 230, and also that the displacement of the mass 234 from the stable position is a function of the strength of the electrostatic attractive force 244. This provides an alternative way to control the acceleration sensitivity of the capacitor 230 by changing the alternating voltage of the AC source 214 of FIG. 3 instead of adjusting the threshold voltage 219 obtained from the potentiometer 218. This is achieved by connecting the source 214 to the potentiometer 218 through an AC-DC rectifying supply. A higher alternating voltage from the source 214 results in stronger electrostatic attractive force 244, hence lower threshold value of acceleration. To obtain higher threshold value of acceleration, a lower voltage is therefore used for the AC source 214.

Figure 5:
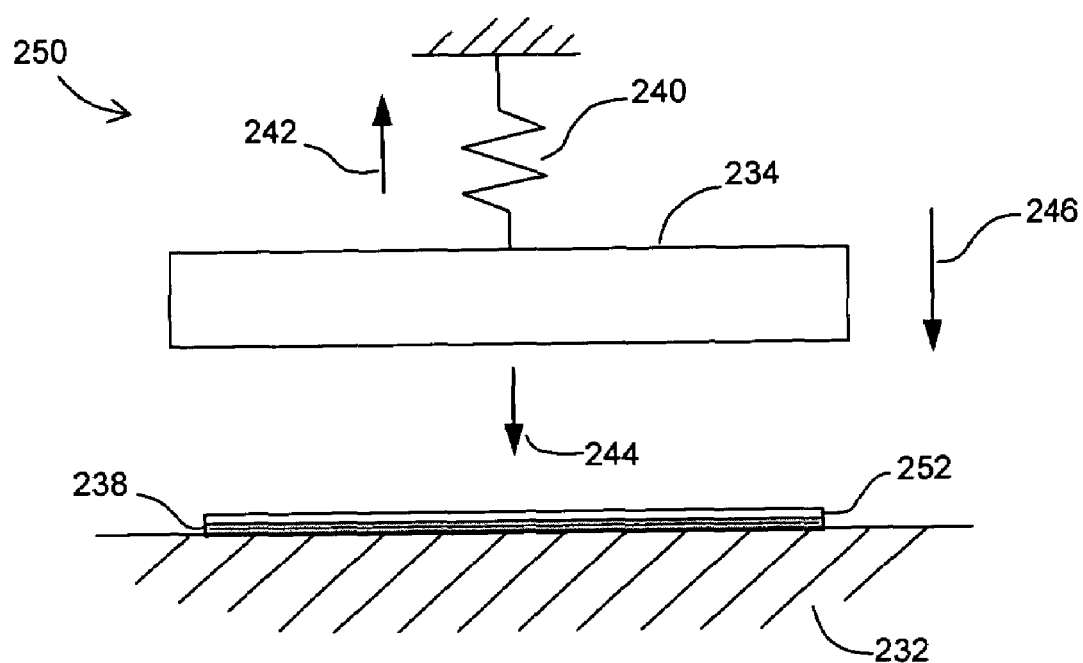

FIG. 5 shows another variable capacitor 250. The variable capacitor 250 is similar to that of FIG. 4 except that the proof mass 234 has no spacers 236 on the surface facing the base 232. To prevent the mass 234 and the electrode 232 from short-circuit, an insulating layer 252 is deposited on top of the electrode 238. The insulating layer 252 provides a non-metal contact between the mass 234 and the electrode 232. The non-metal contact eliminates problems such as micro-welding, arcing, and oxidation. The thickness of the insulating layer 252 provides a minimum gap between the mass 234 and the electrode 232, which gives a maximum capacitance when the mass 234 is in contact with the insulating layer 252.

Figure 6:
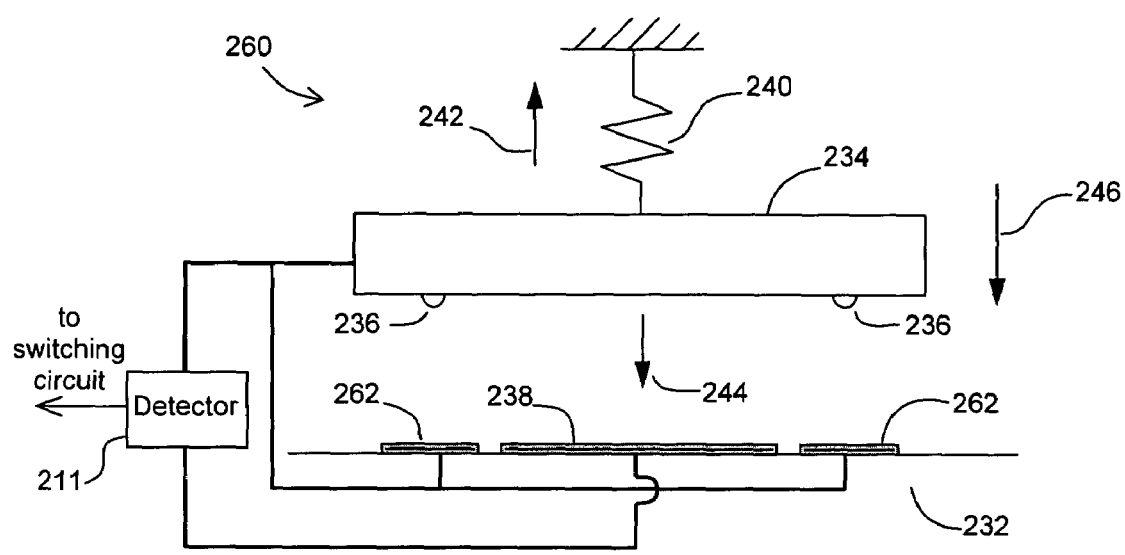

FIG. 6 shows another variable capacitor 260. In this arrangement, in addition to the first electrode 238 and the proof mass 234 forming a second electrode, there is at least one third electrode 262 deposited on the base 232 adjacent to the first electrode 238 and facing the spacers 236. The spacers 236 need not be insulated. The third electrodes 262 are electrically connected to the mass 234 so that the electrical potential of the third electrodes 262 and the mass 234 are the same. When the electrostatic attractive force 244 draws the mass 234 towards the base 232, the spacers 236 come into contact with the third electrodes 262 preventing contact between the mass 234 and the first electrode 238 and leaving an air gap in between the two. Since the spacers 236 are small, the contacting area is minimized and by having a same electrical potential with the mass 234, the binding problem of FIG. 4 is avoided.

Although the invention has been described with reference to preferred embodiments, it will be apprecitaed by those persons skilled in the art that the invention may be embodied in many other forms.

The invention claimed is:

1. A switching arrangement sensitive to acceleration, the switching arrangement comprising:
   an acceleration sensitive variable capacitor;
   a detection circuit for detecting a capacitance value of the variable capacitor; and
   a switching circuit comprising:
      a differential amplifier providing a first input voltage to an electric switch
      a potentiometer providing a second input voltage to the electronic switch; and
      the electronic switch responsive to a comparison between the detected capacitance and a threshold value.

2. The switching arrangement of claim 1, wherein the variable capacitor comprises a base with at least one first electrode thereon and a mass forming a second electrode resiliently suspended by at least one spring a first predetermined distance from the base.

3. The switching arrangement of claim 2, wherein the spring applies a first force to the mass in a direction away from the base.

4. The switching arrangement of claim 2, wherein the first electrode is adapted to provide an electrostatic attractive force to the mass, the attractive force being inversely proportional to the distance between the electrode and the mass.

5. The switching arrangement of claim 1, wherein the detection circuit comprises a voltage supply and a resistive load.

6. The switching arrangement of claim 5, wherein the voltage supply is an alternating voltage supply.

7. The switching arrangement of claim 1, wherein the first input voltage corresponds to the detected capacitance and the second input voltage corresponds to the threshold value.

8. The switching arrangement of claim 7, wherein the electronic switch is triggered positive upon the second input voltage becoming larger than the first input voltage.

9. The switching arrangement of claim 7, wherein the threshold value is variable by adjusting the potentiometer to change the second input voltage.

* * * * *